UNITED STATES PATENT OFFICE.

ASAHEL K. EATON, OF BROOKLYN, NEW YORK.

IMPROVEMENT IN RENDERING SAFES FIRE-PROOF.

Specification forming part of Letters Patent No. 28,459, dated May 29, 1860.

*To all whom it may concern:*

Be it known that I, ASAHEL K. EATON, of the city of Brooklyn, county of Kings, and State of New York, have invented a new and Improved Method of Rendering Safes Fire-Proof; and I do hereby declare that the following is a full and exact description of the said invention.

The nature of my invention consists in the use of pure alumina or the sulphate of alumina, or the double sulphate of alumina and ammonia, as a material to be used for packing between the walls of safes for the purpose of giving the requisite non-conducting quality.

The sulphate of alumina may be used by itself, in which case the action of heat will convert it into pure alumina. The double sulphate of alumina and ammonia may also be used either by itself or in combination with the sulphate of alumina, in which case the action of heat will decompose the sulphate and produce pure alumina. Either of these substances by previous ignition may be converted into pure alumina, and this product may be made use of directly. The same material may be used as packing for refrigerators, air-tight and other stoves, ovens, and for all other purposes when a superior non-conducting substance is desired.

What I claim, and desire to secure by Letters Patent, is—

The use of pure alumina or the substances from which it may be produced, as hereinbefore mentioned and described, in the manner above mentioned.

A. K. EATON.

Witnesses:
 JONATHAN EDWARDS,
 G. GAY.